United States Patent [19]
Hofmann et al.

[11] 3,892,772
[45] July 1, 1975

[54] ISOMER OF 1-(P-CHLOROPHENYL)-1,2-CYCLO-PROPANEDICARBOXIMIDE AND METHOD OF USE

[75] Inventors: Corris Mabelle Hofmann, Ho-Ho-Kus, N.J.; Arnold Curtis Osterberg, Pearl River; Eugene Newton Greenblatt, Spring Valley, both of N.Y.; David Henry Tedeschi, Little Falls, N.J.

[73] Assignee: American Cyanamid Company, Stamford, Conn.

[22] Filed: Dec. 4, 1973

[21] Appl. No.: 421,559

[52] U.S. Cl. .......................... 260/326.5 B; 424/274
[51] Int. Cl. ............................................. C07d 27/30
[58] Field of Search ............................. 260/326.5 B

[56] References Cited
UNITED STATES PATENTS
3,344,026   9/1967   Greenblatt et al. ................ 424/274

*Primary Examiner*—Joseph A. Narcavage
*Attorney, Agent, or Firm*—Ernest Y. Miller

[57] ABSTRACT

The preparation of (1 S, 2 R)—(—) 1-(p-chlorophenyl)-1,2-cyclopropanedicarboximide and its use for relief of anxiety, is described.

3 Claims, No Drawings

ISOMER OF 1-(P-CHLOROPHENYL)-1,2-CYCLOPROPANEDICARBOXIMIDE AND METHOD OF USE

PRIOR ART

It has been known for many years that organic compounds may exist as racemic compounds. These compounds can in some instances, be separated by several methods including chemical methods. Often the separation of the optical isomers is difficult, time consuming and manytimes unsuccessful. The mere structure of a racemic compound does not lend itself to a predictive method of separation. Applicants have used many reagents in an attempt to separate the racemic 1-(p-chlorophenyl)-cis-1,2-cyclopropanedicarboxylic acid. For example, experiments using optically active amines such as arginine, ephedrine, 1-naphthylethylamine, desoxyephedrine, α-methylbenzylamine and 2,2'-(ethylenediimino)-di-1-butanol (ethambutol) have been unsuccessful as they do not form crystalline salts with cis-1-(p-chlorophenyl)-1,2-cyclopropanedicarboxylic acid.

DESCRIPTION OF THE INVENTION

We have now found the (1 S, 2 R)— (−) isomer of 1-(p-chlorophenyl)-1,2-cyclopropanedicarboximide of the present invention can be conveniently prepared by the treatment of racemic 1-(p-chlorophenyl)-cis-1,2-cyclopropanedicarboxylic acid with 2 equivalents of (+) 2-aminobutanol to give nearly exclusively the neutral salt of the (−) isomer of 1-(p-chlorophenyl)-1,2-cyclopropanedicarboxylic acid. This salt, when treated with a strong mineral acid such as hydrochloric acid, is converted to nearly optically pure (−) 1-(p-chlorophenyl)-1,2-cyclopropanedicarboxylic acid. The dicarboxylic acid may be recrystallized from acetonitrile, and then treated with ammonia or urea in a suitable solvent, such as xylene, at a temperature of 50°-150°C. for a period of from 4 to 24 hours to give (1 S, 2 R)-(−) 1-(p-chlorophenyl)-1,2-cyclopropanedicarboximide. As indicated above, other optically active amines such as arginine, ephedrine, 1-naphthylethylamine, desoxyephedrine, α-methylbenzylamine and 2,2'-(ethylenediimino)-di-1-butanol (ethambutol) do not form crystalline salts with cis-1-(p-chlorophenyl)-1,2-cyclopropanedicarboxylic acid and therefore cannot be used in place of (+) 2-aminobutanol. It is an advantage of this invention that the crystalline salt which is obtained with (+) 2-aminobutanol is nearly optically pure. Because of this, the regenerated (−) 1-(p-chlorophenyl)-1,2-cyclopropanedicarboxylic acid is obtained in a high degree of optical purity. Finally, cyclization of the dicarboxylic acid yields (1 S, 2 R)— (−) 1-(p-chlorophenyl)-1,2-cyclopropanedicarboximide of high optical purity.

In U.S. Pat. No. 3,166,571, novel cyclopropanedicarboximides are described which exhibit activity as central nervous system depressants, and in U.S. Pat. No. 3,344,026, more specifically, there is described the use of racemic 1-(p-chlorophenyl)-1,2-cyclopropanedicarboximide (melting point 141.5°-143°C.) in the relief of depression in warm-blooded animals. Although the biological properties of the optical components of a racemic mixture frequently are not readily distinguishable or differ only very slightly from that of the racemic mixture, we have found that (1 S, 2 R)— (−) 1-(p-chlorophenyl)-1,2-cyclopropanedicarboximide shows surprising and unexpected advantages over the racemic mixture in its ability to produce certain responses in standard tests with laboratory animals which are known to correlate well with relief of anxiety in man.

One of these procedures measures the protective action of agents against convulsive seizures caused by the administration of agents such as strychnine sulfate to warm-blooded animals such as mice. According to M. I. Gluckman, Current Therapeutic Research, Vol. 7, pp. 721–740 (1965), there is a high degree of correlation between anticonvulsant protection in animals and relief of anxiety in man. In a modification of the method of H. M. Hanson and C. A. Stone ["Animal and Clinical Pharmacological Techniques in Drug Evaluation", Volume 1, Edited by J. H. Nodine and P. E. Siegler, Yearbook Medical Publishers, Chicago, Ill., 1964, p. 317], groups of at least ten albino male mice (18–20 grams) are treated with graded intraperitoneal doses of racemic or (1 S, 2 R)— (−) 1-(p-chlorophenyl)-1,2-cyclopropanedicarboximide. Thirty minutes later strychnine sulfate is administered in saline at a dose of 0.82 milligrams per kilogram subcutaneously (a dose estimated to cause tonic extensor seizures in 95 percent of the mice), and the animals are observed for tonic extensor seizures. The doses of racemic and (1 S, 2 R)— (−) 1-(p-chlorophenyl)-1,2-cyclopropanedicarboximide which protect 50 percent of the animals ($ED_{50}$) are calculated by the method of J. T. Litchfield and F. Wilcoxon, Journal of Pharmacology and Experimental Therapeutics, Volume 96, pp. 99–113 (1949). The results are shown in Table I.

TABLE I

Protection against strychnine-induced seizures in mice (0.82 mg./kg. s.c. of strychnine sulfate)

| Agent | $ED_{50}$ (95% confidence limits) mg./kg. i.p. |
|---|---|
| racemic 1-(p-chlorophenyl)-1,2-cyclopropanedicarboximide | 16 (14–19) |
| (1 S, 2 R)- (-) 1-(p-chlorophenyl)-1,2-cyclopropanedicarboximide | 3.4 (2.2–5.9) |
| chlordiazepoxide | 4.5 (2.5–8.0) |
| meprobamate | 131 (99–173) |

It can be seen from Table I that (1 S, 2 R)— (−) 1-(p-chlorophenyl)-1,2-cyclopropanedicarboximide possesses a nearly five-fold potency advantage over that of the racemic form. For purposes of comparison, the $ED_{50}$'s of two commercially used anti-anxiety agents, chlordiazepoxide and meprobamate are included.

Another test which has been used to assess anti-anxiety effects is a non-conditioned passive avoidance procedure described by J. R. Vogel, B. Beer and D. E. Clody, "A Simple and Reliable Conflict Procedure for Testing Anti-anxiety Agents," Psychopharmacologia, Vol. 21, pp. 1–7 (1971). A conflict situation is induced in rats by a modification of this method. To groups of five to fifteen naive Sprague-Dawley rats (200–220 grams), previously deprived of water for forty-eight hours, are administered graded oral doses of racemic or (1 S, 2 R)— (−) 1-(p-chlorophenyl)-1,2-cyclopropanedicarboximide suspended in 2 percent starch vehicle, or vehicle alone (controls). One hour later each rat is placed in a plexiglass box fitted with a drinkometer circuit connected between the stainless steel grid floor and a stainless steel drinking tube inserted in a hole in one of the walls of the box. A stimulator supplying monophasic 60 cycle square wave pulses of 0.2 milliamperes peak intensity, a timer which allows alternate 5 second "shock free" and 5 second " shock available" periods during a 3 minute test period, an electromagnetic counter to count the number of shocks received by the rat during the shock available period and a delay of one half second between the successive shocks are incorporated into the drinkometer circuit. After the rat is placed in the box, it is allowed to explore and drink 10 percent dextrose solution supplied through the tap. After twenty seconds of continuous unpunished drinking, the timer and drinkometer circuits are activated and 5 second shock free and 5 second shock available periods alternate. The number of shocks received by the rat during a 3 minute test period is recorded. The percentage of rats that receives twelve or more shocks at each dose level is used to calculate the median effective dose ($ED_{50}$). These values are corrected for a level of 20 percent response in control animals (starch vehicle). Table II shows the results obtained with racemic and (1 S, 2 R)— (—) 1-(p-chlorophenyl)-1,2-cyclopropanedicarboximide, as well as with two commercially used anti-anxiety agents, chlordiazepoxide and meprobamate.

TABLE II

Conflict Passive Avoidance Test in Water-deprived Rats

| Agent | $ED_{50}$(95% C.L.) mg./kg. oral |
|---|---|
| racemic 1-(p-chlorophenyl)-1,2-cyclopropanedicarboxamide | 0% effect at 50 mg./kg. $ED_{50}$ could not be determined |
| (1 S, 2 R)- (—) 1-(p-chlorophenyl)-1,2-cyclopropanedicarboximide | 40 (29–55) |
| chlordiazepoxide | 4.8 (3.2–7.2) |
| meprobamate | 20 (15–26) |

It can be seen from Table II that racemic 1-(p-chlorophenyl)-1,2-cyclopropanedicarboximide does not produce an effect at the highest dose tested and an $ED_{50}$ cannot therefore be calculated. However, the (1 S, 2 R)— (—) isomer of 1-(p-chlorophenyl)-1,2-cyclopropanedicarboximide produces a dose related response and the $ED_{50}$ (95 percent confidence limits) is readily calculated by the method of J. T. Litchfield and F. Wilcoxon [Journal of Pharmacology and Experimental Therapeutics, Volume 96, pp. 99–113 (1949)].

Thus, by means of these two standard procedures, we have demonstrated the surprising and unanticipated advantages of (1 S, 2 R)— (—) 1-(p-chlorophenyl)-1,2-cyclopropanedicarboximide over the racemic form, as an anti-anxiety agent in warm-blooded animals.

The compound (1 S, 2 R)— (—) 1-(p-chlorophenyl)-1,2-cyclopropanedicarboximide can be used for the relief of anxiety in dosages of from about 1 to 50 milligrams per kilogram of body weight per day. The dosage unit forms may contain from about 60 mg. to about 2 grams to be administered one or several times per day depending upon the warm-blooded animal.

The active component of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

SPECIFIC DISCLOSURE

The following examples describe the preparation of the active compound of the present invention. Parts are by weight unless otherwise indicated.

EXAMPLE 1

Preparation of (—) 1-(p-Chlorophenyl)-cis-1,2-cyclopropanedicarboxylic acid, salt with (+) 2-aminobutanol A solution of 192.5 parts of racemic cis-1-(p-chlorophenyl)-1,2-cyclopropanedicarboxylic acid, 142 parts of (+) 2-aminobutanol and 1,600 parts of acetone is allowed to stand at room temperature for 2 days. The solid is collected, washed with acetone and air dried to give 156 parts of (−) 1-(p-chlorophenyl)-cis-1,2-cyclopropanedicarboxylic acid, salt with (+) 2-aminobutanol, as a white solid. This neutral salt may be converted to the compound of Example 2 without further purification. However, the salt can be recrystallized from acetonitrile from which it is obtained as a white crystalline solid, melting point 153°–155°C., $\alpha_D^{25} = -95° \pm 1°$ ($H_2O$).

Anal. Calcd. for $C_{19}H_{31}N_2O_6Cl$: C, 54.5; H, 7.46; N, 6.69; Cl, 8.46. Found: C, 54.0; H, 7.35; N, 6.65; Cl, 8.66.

EXAMPLE 2

Preparation of (−) 1-(p-Chlorophenyl)-cis-1,2-cyclopropanedicarboxylic acid

A solution of 156 parts of the compound from Example 1 in 300 parts of warm water is acidified with 12N hydrochloric acid and then cooled. The solid is collected, washed with water dried, and recrystallized from acetonitrile. This gives 39 parts of (−) 1-(p-chlorophenyl)-cis-1,2-cyclopropanedicarboxylic acid, melting point 173°–175°C. dec., $\alpha_D^{25} = -183° \pm 1°$ (alcohol).

Analysis Calcd. for $C_{11}H_9ClO_4$: C, 54.9; H, 3.77; Cl, 14.7. Found: C, 55.0; H, 3.85; Cl, 14.8.

EXAMPLE 3

Preparation of (1 S, 2 R)— (−) 1-(p-Chlorophenyl)-1,2-cyclopropanedicarboximide

A mixture of 26.7 parts of (−) 1-(p-chlorophenyl)-1,2-cyclopropanedicarboxylic acid, 9.7 parts of urea and 800 parts of xylene is stirred and refluxed for 8 hours, and then cooled and filtered to give 20 parts of a white solid. An additional 5.8 parts of a white solid is obtained from the filtrate after water wash and evaporation. The combined solids are recrystallized from alcohol to give 18.8 parts of (1 S, 2 R)— (−) 1-(p-chlorophenyl)-1,2-cyclopropanedicarboximide as a white crystalline solid, melting point 172°–173°C., $\alpha_D^{25} = -63° \pm 1°$ (MeOH). The precise structure has been determined by X-ray crystallographic analysis, and the absolute configuration (1 S, 2 R)— has been assigned by means of the anomalous dispersion of the chlorine atom.

Anal. Calcd. for $C_{11}H_8NO_2Cl$: C, 59.6; H, 3.64; N, 6.32; Cl, 16.0. Found: C, 59.8; H, 3.88; N, 6.19; Cl, 15.7.

We claim:

1. The compound (1 S, 2 R)— (−) 1-(p-chlorophenyl)-1,2-cyclopropanedicarboximide, having a melting point of about 172°–173°C.

2. The process of preparing (1 S, 2 R)— (−) 1-(p-chlorophenyl)-1,2-cyclopropanedicarboximide which comprises contacting racemic 1-(p-chlorophenyl)-cis-1,2-cyclopropanedicarboxylic acid with (+) 2-aminobutanol to produce a neutral salt of said dicarboxylic acid, treating the salt with a strong mineral acid to produce (−) 1-(p-chlorophenyl)-1,2-cyclopropanedicarboxylic acid, heating the latter in a solvent with ammonia or urea at a temperature of from 50°C. to 150°C. for a period of from 4 hours to 24 hours and recovering said compound therefrom.

3. The process for the resolution of racemic 1-(p-chlorophenyl)-cis-1,2-cyclopropanedicarboxylic acid which comprises treating the latter with (+) 2-aminobutanol and subsequently with a strong mineral acid and recovering (−) 1-(p-chlorophenyl)-1,2-cyclopropanedicarboxylic acid therefrom.

* * * * *